United States Patent
Matsumoto et al.

(10) Patent No.: US 7,445,832 B2
(45) Date of Patent: Nov. 4, 2008

(54) RIBBONED POLARIZATION-MAINTAINING FIBER AND MANUFACTURING METHOD THEREFOR, AND POLARIZATION-MAINTAINING OPTICAL FIBER ARRAY USING THE SAME

(75) Inventors: Akira Matsumoto, Nagoya (JP); Masashi Fukuyama, Inuyama (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/036,325

(22) Filed: Dec. 26, 2001

(65) Prior Publication Data
US 2002/0081084 A1 Jun. 27, 2002

(30) Foreign Application Priority Data
Dec. 25, 2000 (JP) .............................. 2000-392675
Nov. 21, 2001 (JP) .............................. 2001-355756

(51) Int. Cl.
*G02B 6/44* (2006.01)
(52) U.S. Cl. ........................ 428/174; 428/156; 428/167; 385/114; 385/115; 385/123
(58) Field of Classification Search ................. 428/174, 428/156, 167; 385/78, 65, 83, 59, 71, 114, 385/11, 123, 126, 115, 120, 54
See application file for complete search history.

(56) References Cited

U.S. PATENT DOCUMENTS

| 3,871,935 | A | * | 3/1975 | Gloge et al. ................. 156/158 |
| 4,147,407 | A | * | 4/1979 | Eichenbaum et al. ........ 385/141 |
| 4,274,854 | A | * | 6/1981 | Pleibel et al. ................. 65/403 |
| 5,550,943 | A | * | 8/1996 | Elderstig et al. ............... 385/71 |
| 5,561,731 | A | * | 10/1996 | Cooke et al. ................. 385/114 |
| 5,672,008 | A |   | 9/1997 | Bonniau et al. |
| 5,689,599 | A | * | 11/1997 | Shahid ......................... 385/83 |
| 5,761,363 | A | * | 6/1998 | Mills ........................... 385/114 |
| 5,862,281 | A |   | 1/1999 | Shahid ......................... 385/78 |
| 6,045,269 | A | * | 4/2000 | Watanabe et al. ............. 385/59 |
| 6,173,098 | B1 | * | 1/2001 | Steijer et al. ................... 385/65 |
| 6,192,178 | B1 | * | 2/2001 | Logan et al. ................. 385/109 |

FOREIGN PATENT DOCUMENTS

DE 198 43 164 4/2000

(Continued)

OTHER PUBLICATIONS

U.S. Appl. No. 10/027,793, filed Dec. 21, 2001, Akira Matsumoto et al.

*Primary Examiner*—Alicia Chevalier
(74) *Attorney, Agent, or Firm*—Burr & Brown

(57) ABSTRACT

A ribboned polarization-maintaining fiber is used to easily manufacture a polarization-maintaining optical fiber array with multiple fibers and improve the work efficiency and yield. The ribboned polarization-maintaining fiber includes a plurality of polarization-maintaining fibers, and has a ribbon portion of 2 to 300 mm in length surrounding at least some of the polarization-maintaining fibers. The ribboned polarization-maintaining fiber is manufactured by arranging the polarization-maintaining fibers with an exact pitch width while the end face of the polarization-maintaining fibers are rotationally adjusted so as to have a predetermined plane of polarization and then by fixing and coating a part thereof by and with an adhesive, thereby forming the ribbon portion.

8 Claims, 7 Drawing Sheets

FOREIGN PATENT DOCUMENTS

| | | |
|---|---|---|
| EP | 0 947 867 A2 | 6/1999 |
| EP | 0 926 522 A2 | 10/1999 |
| FR | 2 403 572 | 4/1979 |
| JP | U-57-164707 | 4/1956 |
| JP | 58-137807 | 8/1983 |
| JP | U-60-60711 | 4/1985 |
| JP | 60-254008 | 12/1985 |
| JP | 62-134608 | 6/1987 |
| JP | 01-112210 | 4/1989 |
| JP | 01-300207 | 12/1989 |
| JP | 02-244108 | 9/1990 |
| JP | 4-110806 | 4/1992 |
| JP | 05-221694 | 8/1993 |
| JP | 05-303027 | 11/1993 |
| JP | 06-222246 | 8/1994 |
| JP | 6-230246 | 8/1994 |
| JP | 06-230246 | * 8/1994 |
| JP | 2000-002813 | 1/2000 |
| JP | 2000-009948 | * 1/2000 |

* cited by examiner

FIG.5(a)　　　FIG.5(b)
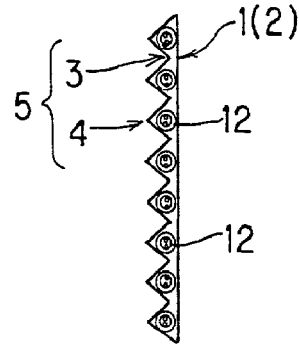
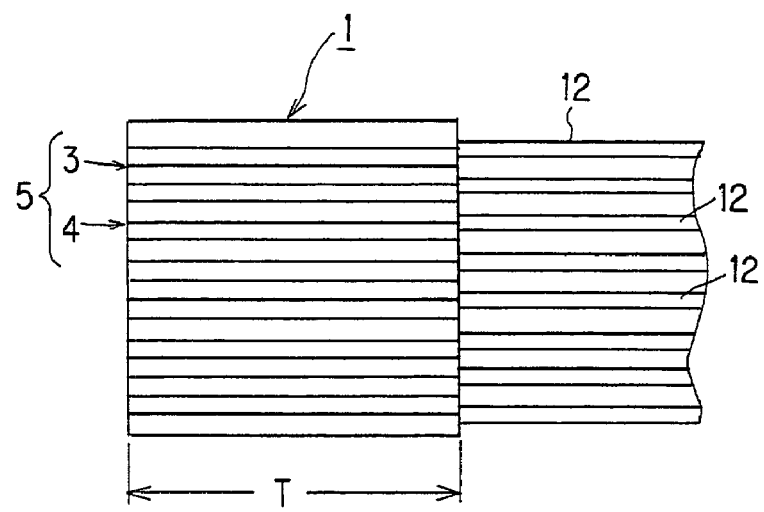
FIG.5(c)
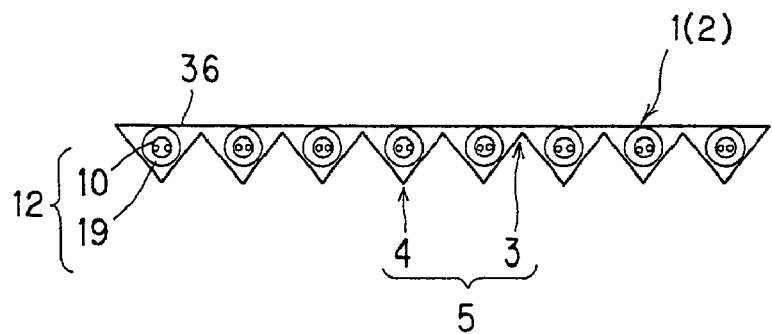
FIG.5(d)
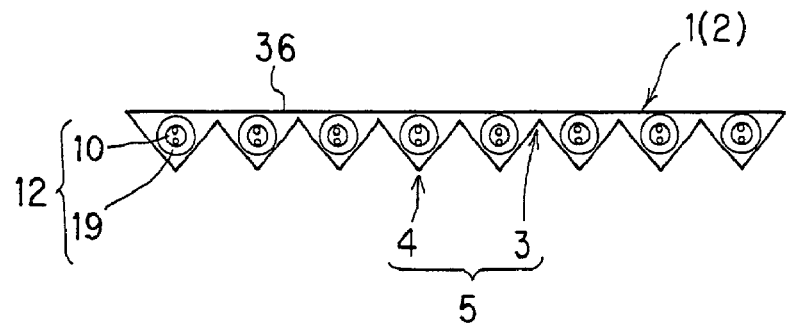

FIG.7(a)
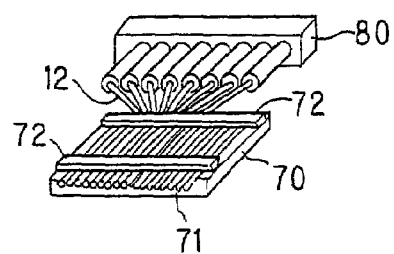
FIG.7(b)
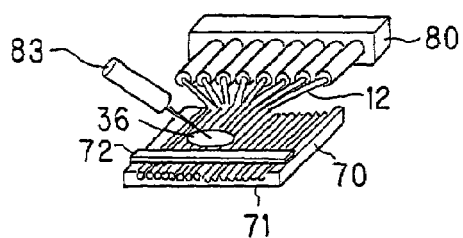
FIG.7(c)
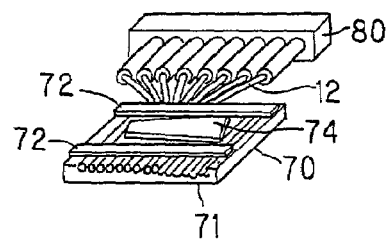
FIG.7(d) FIG.7(e)
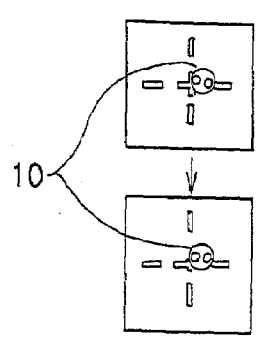 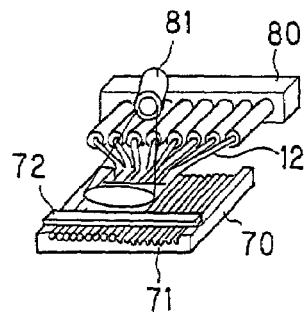
FIG.7(f)
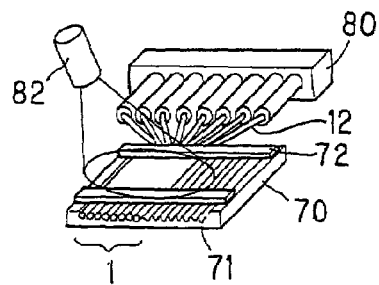
FIG.7(g)
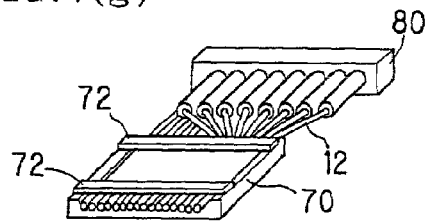
FIG.7(h)
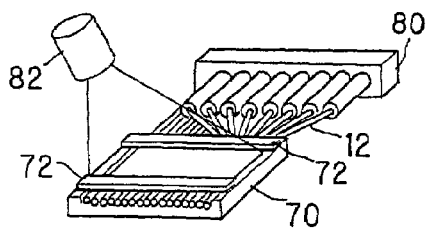
FIG.7(i)
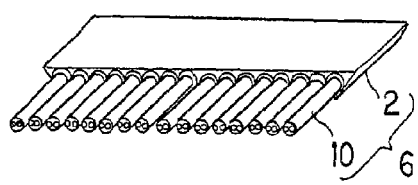

RIBBONED POLARIZATION-MAINTAINING FIBER AND MANUFACTURING METHOD THEREFOR, AND POLARIZATION-MAINTAINING OPTICAL FIBER ARRAY USING THE SAME

BACKGROUND OF THE INVENTION AND RELATED ART STATEMENT

The present invention relates to a ribboned polarization-maintaining fiber and a manufacturing method therefor, and a polarization-maintaining optical fiber array using the ribboned polarization-maintaining fiber.

DESCRIPTION OF THE RELATED ART

In recent years, with the increase in the density of optical fiber, the number of fibers in a planar lightwave circuit (PLC) has increased. Along with the use of multiple fibers, development has been carried on with the aim of shortening the conventional standard waveguide pitch (250 μm is decreased to, for example, 127 μm, about a half) in order to further increase the density while avoiding a larger size of waveguide element. Along with the increased optical fiber density and shortened waveguide pitch, development has been carried on with the aim of decreasing a pitch between fibers in a fiber array connected to an optical fiber.

Also, in the case where an optical waveguide is dependent on polarization or in the case where a special AWG is used to prevent four-wave mixing in WDM communications, a polarization-maintaining fiber is used so that a single polarized wave is introduced in the waveguide.

At this time, for the polarized wave introduced in the waveguide, the necessary direction of the polarized wave has been determined, so that it is necessary to adjust the end face of the polarization-maintaining fiber in the polarization-maintaining optical fiber array to the direction of the polarized wave.

However, if an attempt is made to apply the fiber array now being used to a polarization-maintaining fiber in the same way, the problems described below arise.

For example, when an optical fiber array with a standard 250 μm pitch is manufactured by using coated polarization-maintaining fibers, as shown in FIG. 8, it is indispensable to arrange a plurality of polarization-maintaining fibers with an exact pitch width while the end face of polarization-maintaining fiber is rotationally adjusted so as to have a predetermined plane of polarization.

However, if the pitch between the polarization-maintaining fibers is shortened, the coatings of polarization-maintaining fibers come into contact with each other. Therefore, if some polarization-maintaining fibers are rotationally adjusted, the adjacent polarization-maintaining fibers are interferingly rotated, so that fine adjustment must be made again.

For this reason, all of the polarization-maintaining fibers in the fiber array with multiple fibers must be adjusted by repeating these processes, so that this work requires a great deal of time and labor.

In particular, in the case of AWG, since the number of channels is on the order of 40 channels, it is very difficult to rotationally adjust all of the forty fibers to a predetermined direction, and such adjustment has never been made with success industrially.

To solve the above problems, a method in which polarization-maintaining fibers are adjusted and fixed one by one when the polarization-maintaining optical fiber array is manufactured may possibly be used. However, since the polarization-maintaining fibers are aligned at short intervals of 250 μm (especially, 127 μm), it is difficult to bond and fix the fibers one by one.

Also, a method in which a jig is provided on the outside of the polarization-maintaining optical fiber array and polarization-maintaining fibers having been rotationally adjusted in advance is fixed temporarily may possibly be used. However, with the increase in the number of fibers, the jig must be made more complicated and larger, so that this method is difficult to use in the optical fiber array in which fibers are aligned at short intervals of 250 μm (especially, 127 μm).

On the other hand, for a single mode (SM) fiber, a half-pitch array, in which the fiber pitch is shortened to about a half of the conventional pitch, has mainly been used in recent years.

This half-pitch fiber array is constructed so that fiber ribbons are superposed vertically while being shifted by 127 μm and fibers in one fiber ribbon come into gaps between fibers in the other fiber ribbon as shown in FIGS. 9(*a*), 9(*b*) and 9(*c*).

However, the above-described fiber array has a problem in that one or both of the upper and lower fibers are bent vertically.

Also, since the above-described fiber array suffers greater interference than the fiber array with a 250 μm pitch and the fibers thereof are bent, it is very difficult to realize a polarization-maintaining optical fiber array with the half pitch.

SUMMARY OF THE INVENTION

The present invention has been achieved to solve the above problems with the prior art, and accordingly an object thereof is to provide a ribboned polarization-maintaining fiber in which when a polarization-maintaining optical fiber array is manufactured, the polarization-maintaining fibers need not be rotationally adjusted so as to have a predetermined plane of polarization, so that not only a polarization-maintaining optical fiber array with multiple fibers can be manufactured easily but also the work efficiency and yield can be improved and a manufacturing method therefor, and a polarization-maintaining optical fiber array using the ribboned fiber.

According to the first aspect of the present invention, there is provided a ribboned polarization-maintaining fiber comprising a plurality of polarization-maintaining fibers, wherein a ribbon portion having a length of 2 to 300 mm is formed in surrounding at least some of polarization-maintaining fibers.

It is preferable that the ribbon portion is made of a portion formed by fixing and coating said polarization-maintaining fibers with an adhesive, and aligning end faces of said polarization-maintaining fibers which are used at least as a signal so as to become a predetermined plane of polarization.

Moreover, the ribbon portion is provided with a positioning means. And said positioning means maybe formed as a series of convex and concave shapes.

Furthermore, said convex and concave shapes may be disposed at a regular pitch or discontinuously; and said convex and concave shapes may be formed as a saw tooth shape or a curved wavy shape.

According to the second aspect of the present invention, there is provided a manufacturing method for a ribboned polarization-maintaining fiber, which comprises steps of aligning a plurality of polarization-maintaining fibers with a precise pitch width while adjusting rotationally end faces of polarization-maintaining fibers so as to form a predetermined plane of polarization, and fixing and coating a part of thus aligned polarization-maintaining fibers with an adhesive so as to form a ribbon portion.

Also, according to the third aspect of the present invention, there is provided a manufacturing method for a ribboned polarization-maintaining fiber, which comprises steps of preparing a ribbon-making jig consisting of an upper mold and a lower mold both of which have a ribbon-making groove for making a ribbon of a plurality of polarization-maintaining fibers, aligning a plurality of polarization-maintaining fibers in a V-groove portion provided at both ends of the ribbon-making groove of said lower mold while adjusting rotationally end faces of the polarization-maintaining fibers so as to form a predetermined plane of polarization, thereafter pouring an adhesive into a frame formed by the ribbon-making grooves of said upper and lower molds and curing thus poured adhesive to form a ribbon portion on some of polarization-maintaining fibers, and subsequently removing said upper and lower molds to obtain a ribboned polarization-maintaining fiber.

Further, according to the fourth aspect of the present invention, there is provided a manufacturing method for a ribboned polarization-maintaining fiber, which comprises steps of preparing a ribbon-making jig consisting of an upper mold, and a lower mold having a ribbon-making groove for making a ribbon of a plurality of polarization-maintaining fibers and a plurality of V-shaped grooves provided at both ends of the ribbon-making groove, placing a plurality of polarization-maintaining fibers in said V-groove portions of said lower mold, fixing temporarily thus placed polarization-maintaining fibers by placing said upper mold at both ends of said lower mold, thereafter coating thus aligned fibers with an adhesive by adding an adhesive onto said ribbon-making groove of said lower mold, aligning said polarization-maintaining fibers while rotationally adjusting end faces of them so as to form a predetermined plane of polarization, curing thus applied adhesive to form a ribbon portion on some of polarization-maintaining fibers, and subsequently removing said upper molds and said lower mold to obtain a ribboned polarization-maintaining fiber.

Further, in the present invention, it is preferable to coat a portion in which said polarization-maintaining fibers come into contact with each other with an adhesive during the step of rotationally adjusting the end faces of said polarization-maintaining fibers.

Also, it is preferable to use an adhesive having a viscosity of 10000 cP or lower, and preferably said adhesive may be a urethane acrylate resin.

Also, according to the fifth aspect of the present invention, there is provided a ribbon-making jig, comprising:

a lower mold having a ribbon-making groove for fixing and coating polarization-maintaining fibers aligned previously by and/or with an adhesive, and V-groove portions provided at both ends of said ribbon-making groove to align said polarization-maintaining fibers; and an upper mold having a ribbon-making groove provided symmetrically with the ribbon-making groove in said lower mold, and an adhesive in-flow portion for supplying an adhesive into said ribbon-making groove; said portion being formed in a central portion of said ribbon-making groove.

Further, according to the sixth aspect of the present invention, there is provided a polarization-maintaining optical fiber array made of a ribboned polarization-maintaining fiber according to any one of the aforementioned ribboned polarization-maintaining fiber.

BRIEF DESCRIPTION OF THE DRAWINGS

FIG. 5(a) is a left-hand side view, FIG. 5(b) is a front view, FIG. 5(c) is detailed view 1 of FIG. 5(a), and FIG. 5(d) is detailed view 2 of FIG. 5(a), showing another example of a ribboned polarization-maintaining fiber in accordance with the present invention.

FIG. 7(a) to FIG. 7(i) are an explanatory view showing an exemplified flow of major steps of a manufacturing method for the ribboned polarization-maintaining fiber shown in FIGS. 5(a) to (c).

DETAILED DESCRIPTION OF THE INVENTION

Figure 1A:
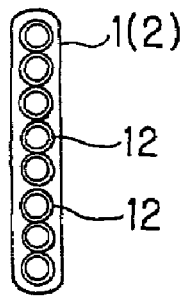
FIG. 1(a) is a left-hand side view.

A ribboned polarization-maintaining fiber in accordance with the present invention is formed of a plurality of polarization-maintaining fibers, and a ribbon portion having a length of 2 to 300 mm is formed to surround some of the polarization-maintaining fibers.

Therefore, when a polarization-maintaining optical fiber array is manufactured from the present ribboned polarization-maintaining fiber, there is no need for rotationally adjusting fibers so as to have a predetermined plane of polarization, so that not only a polarization-maintaining optical fiber array with multiple fibers can be manufactured easily but also the work efficiency and yield can be improved.

Also, a manufacturing method for the above-described ribboned polarization-maintaining fiber is to align a plurality of polarization-maintaining fibers with a precise pitch width while the end face of polarization-maintaining fiber is rotationally adjusted so as to have the predetermined plane of polarization, and to fix and coat a part thereof by and with an adhesive, thereby forming a ribbon portion.

Thus, the ribboned polarization-maintained fiber can be manufactured surely and easily.

More particularly, the ribboned polarization-maintained fiber in accordance with the present invention can be handled in the same manner as in the case of the ordinary optical fiber ribbon. However, the rotational adjustment of the plane of the optical fibers is not required to form a predetermined plane of polarization at the time of manufacturing a polarization-maintaining optical fiber array if the present ribboned polarization-maintained fiber is used.

For example, when a 40-channel polarization-maintaining optical fiber array is manufactured, in the conventional method, even if only one of forty polarization-maintaining fibers fails in the rotational adjustment of the plane of polarization, the optical fiber array as a whole becomes defective. In the present invention, however, the optical fiber array can be manufactured with ease merely by combining five sheets of ribboned polarization-maintaining fibers each of which consists of eight optical fibers so as to form a predetermined plane of polarization. Even if there is a failed ribboned polarization-maintaining fiber, it is necessary only that the failed ribboned polarization-maintaining fiber be replaced with another one. Therefore, the possibility of the occurrence of defectives can be decreased remarkably.

Also, in the conventional method, even when the angle of the plane of polarization is set precisely at the time of rotational adjustment work of polarization-maintaining fibers, however, the plane of the polarization-maintaining fiber may sometimes be dislocated due to the curing or shrinkage of the adhesive.

In this case, if the incidence is assumed to be 1%, when a 40-channel fiber array (FA) is manufactured by the conventional method, the possibility of the occurrence of defectives is 33.1%.

On the other hand, in the case that the present ribboned polarization-maintaining fiber consisting of eight optical fibers is used, the possibility of the occurrence of defectives at the time of manufacturing can be kept at the level of to 7.7%.

Figure 9A:
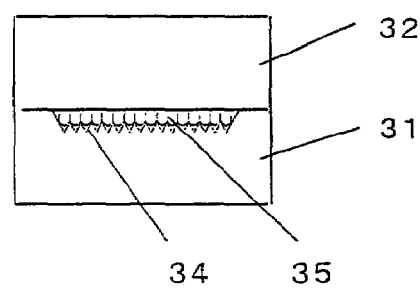
FIG. 9(a) is a left-hand side view.
Figure 9B:
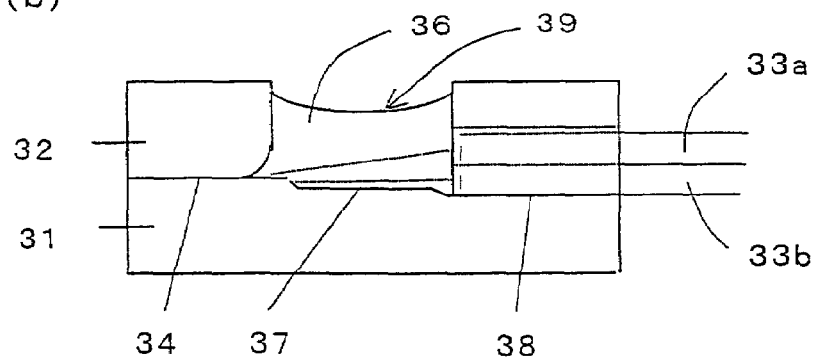
FIG. 9(b) is a front view.
Figure 9C:
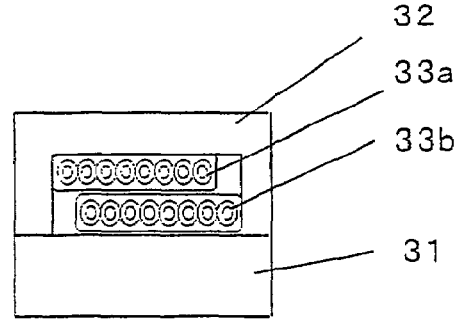
FIG. 9(c) is a right-hand side view, showing an example of a half-pitch fiber array.

For example, when the ribboned polarization-maintaining fiber in accordance with the present invention is incorporated into the half-pitch fiber array shown in FIGS. 9(a), 9(b) and 9(c), even if the aforementioned shrinkage occurs, such a trouble that a polarization-maintaining fiber 10 rotates does not occur because the ribboned polarization-maintaining fiber is fixed by a ribbon portion 2. Therefore, the possibility of the occurrence of defectives at this stage is approximately 0%.

Further, in the conventional method, if a failure occurs when the work is performed on a V-grooved substrate, which is a part for a fiber array, the part for fiber array itself including the V-grooved substrate become out of use.

On the other hand, in the present invention, even if any of the ribboned polarization-maintaining fibers fails, it is necessary only to replace the failed fiber with a new one. Therefore, a loss in the part for fiber array does not occur at all.

Next, the present invention will be described below in more detail with reference to the accompanying drawings.

Figure 1B:
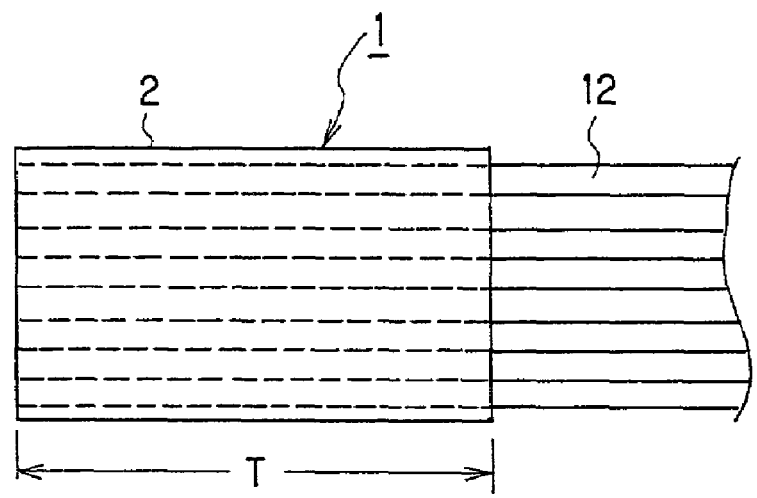
FIG. 1(b) is a front view.
Figure 1C:
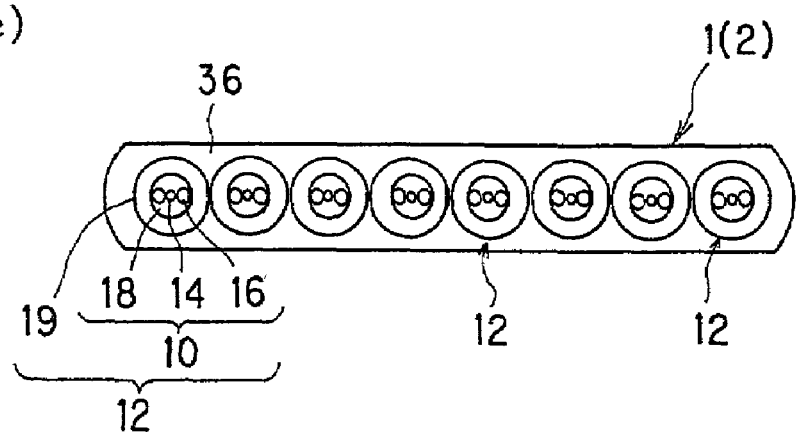
FIG. 1(c) is detailed view 1 of FIG. 1(a)
Figure 1D:
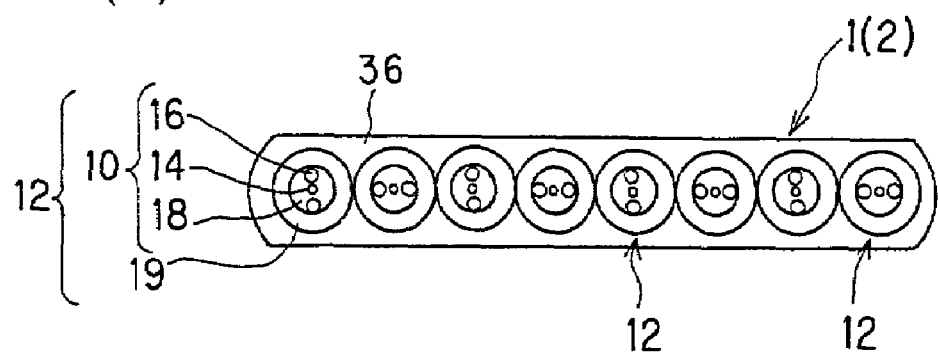
FIG. 1(d) is detailed view 2 of FIG. 1(a), showing an example of a ribboned polarization-maintaining fiber in accordance with the present invention.

FIG. 1(a) is a left-hand side view, FIG. 1(b) is a front view, FIG. 1(c) is detailed view 1 of FIG. 1(a), and FIG. 1(d) is detailed view 2 of FIG. 1(a), showing an example of the ribboned polarization-maintaining fiber in accordance with the present invention.

As shown in FIGS. 1(a) and 1(b), a ribboned polarization-maintaining fiber 1 in accordance with the present invention is disposed in almost the same plane, consists of a plurality of (eight in FIGS. 1(a) and 1(b)) polarization-maintaining fibers 12 (UV coated polarization-maintaining fibers) extending longitudinally so as to be adjacent to each other substantially in parallel, and partially has the ribbon portion 2 of 2 to 300 mm in length (T).

For the ribboned polarization-maintaining fiber in accordance with the present invention, it is important that in the ribbon portion 2, as shown in FIG. 1(c), the polarization-maintaining fibers 12 be fixed by and coated with an adhesive 36, and at least the end faces of the polarization-maintaining fibers 12 which is used as a signal be aligned so as to have a predetermined plane of polarization. As is shown in FIGS. 1(c) and 1(d), the polarization-maintaining fibers 12 include an optical fiber core portion 14, a stress applying pan 16 and a cladding portion 18.

For the ribboned polarization-maintaining fiber in accordance with the present invention, the polarization plane of the polarization-maintaining fibers 12 may be aligned in any direction inclusive of vertical, horizontal, vertical, horizontal direction, or the like, depending upon its application, for example, as shown in FIG. 1(d).

Also, as shown in FIG. 1(b), the length (T) of the ribbon portion 2 need not be longer than is necessary, and it is necessary only that a length contained in the fiber array be made into a ribbon form at the minimum.

However, after the ribboned polarization-maintained fiber has been manufactured, if the fibers are not fixed sufficiently before the fiber array is manufactured, the adjusted angle of rotation is in danger of being shifted. Also, when the fixing of this portion is deteriorated after the fiber array has been manufactured, there is a danger that a torsional stress etc. caused when the ribboned polarization-maintaining fiber is manufactured is applied to the fiber array, thereby decreasing the reliability of the fiber array itself. Therefore, the length (T) of the ribbon portion 2 should preferably be at least 2 mm.

Also, considering an excess length for fiber treatment such as removal and cutting of fiber coating at the time of manufacture of fiber array and rework in the assembly work, the length (T) should more preferably be 20 mm or longer.

When the ribboned polarization-maintaining fiber 1 in accordance with the present invention is manufactured, the end faces of the polarization-maintaining fibers are observed to make rotational adjustment such that the end face of the polarization-maintaining fiber has a predetermined plane of polarization. In this case, the length in which the direction of rotation can be adjusted exactly over the total length of the ribbon portion 2 is about 300 mm due to torsion of the polarization-maintaining fiber 10 caused by the contact of coatings 19 of the polarization-maintaining fibers 12 with each other. For this reason, the length (T) of the ribbon portion 2 should preferably be 300 mm or shorter.

The number of fibers in the ribboned polarization-maintaining fiber in accordance with the present invention is not subject to any special restriction. However, the ribboned polarization-maintaining fiber with five to sixteen fibers is easy to manufacture, and can be used suitably when the polarization-maintaining optical fiber array with multiple fibers is manufactured.

Next, an example of the manufacturing method for a ribboned polarization-maintaining fiber in accordance with the present invention will be described with reference to FIGS. 2(a), 2(b) and 2(c).

Figure 2A:
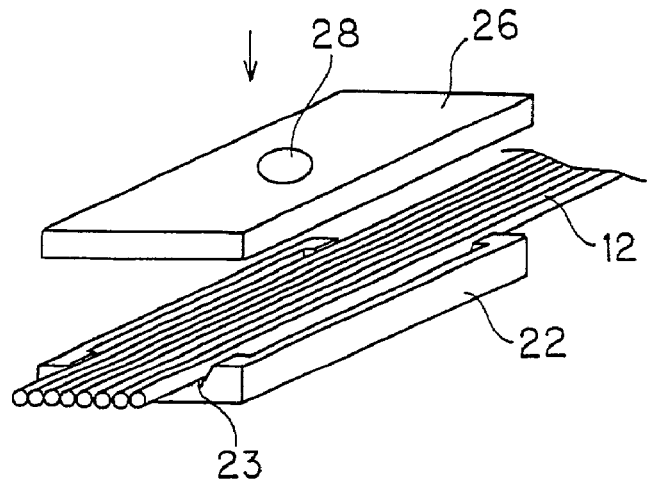
FIG. 2 is an explanatory view showing an example of a manufacturing method for the ribboned polarization-maintaining fiber shown in FIG. 1.

First, as shown in FIG. 2(a), using a ribbon-making jig 20 consisting of an upper mold 26 and a lower mold 22 each having a ribbon-making groove 24 (see FIGS. 3(a), 3(b) and 3(c), and FIGS. 4(a) and 4(b)), a plurality of polarization-maintaining fibers 12 are aligned in V-groove portions 23 provided at both ends of a ribbon-making groove 24a in the lower mold 22.

Next, the end faces of the polarization-maintaining fibers 12 are aligned while being rotationally adjusted so as to have the predetermined plane of polarization while being observed with a CCD camera (not depicted) or the like (see FIG. 1(c)).

At this time, the application of the adhesive 36 to a portion in which the polarization-maintaining fibers 12 come into contact with each other (for example, the polarization-maintaining fibers 12 aligned in the ribbon-making groove 24a) is desirable because the rotational interference of the polarization-maintaining fibers 12 with each other can be made less liable to be brought about.

The reference of the above-describe adjustment is a regression reference line determined from the center point of each polarization-maintaining fiber. However, if V-grooves in the ribbon-making jig are fabricated so as to have the same depth etc. with high accuracy, planer portions at both sides of the V-groove in the ribbon-making jig can be handled as a reference line.

Figure 2B:
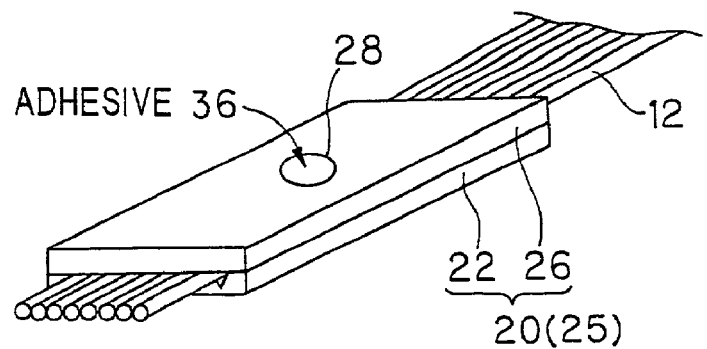
Figure 2C:
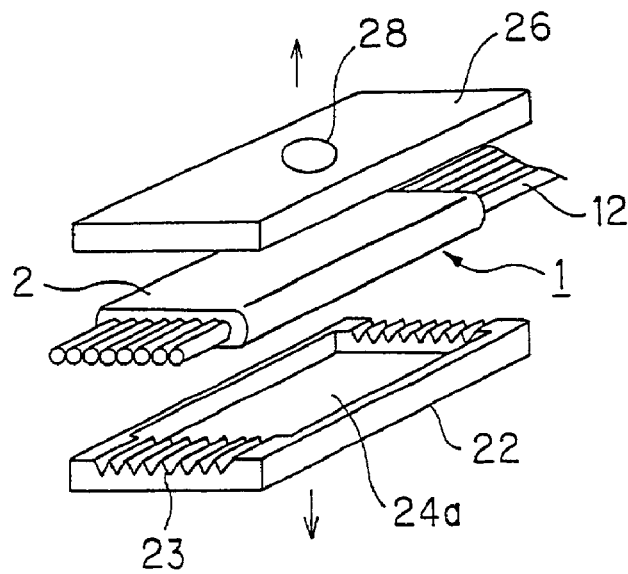
Figures 3A, 3B, 3C:
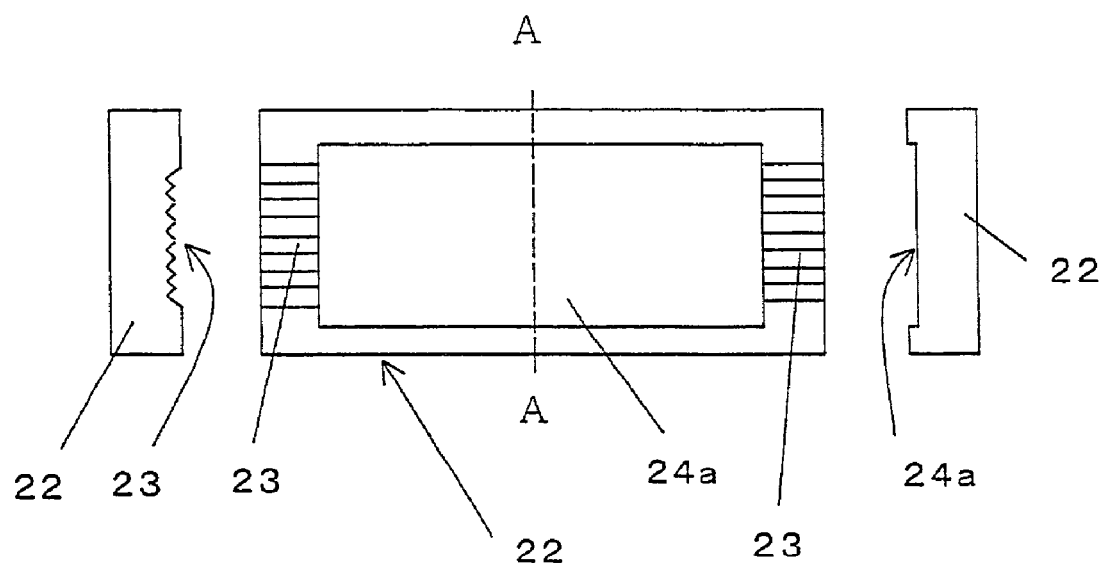
FIG. 3(a) is a left-hand side view.
FIG. 3(b) is a front view.
FIG. 3(c) is a sectional view taken along a line A-A of FIG. 3(b), showing an example of a lower mold of a ribbon-making jig used in the present invention.
Figures 4A, 4B:
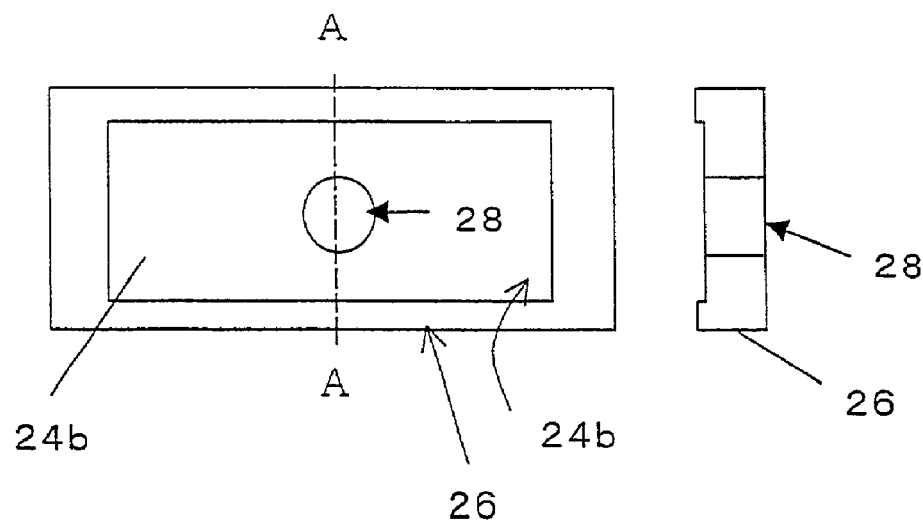
FIGS. 4(a) and 4(b) are a front view and a sectional view taken along the line A-A of FIG. 4(a), respectively, showing an example of an upper mold of a ribbon-making jig used in the present invention.

Further, the upper mold 26 is combined with the lower mold 22 as shown in FIG. 2(b), the adhesive 36 is poured into an obtained mold 25 and is cured, and the lower mold 22 and the upper mold 26 are removed as shown in FIG. 2(c), by which the ribboned polarization-maintaining fiber 1 shown in FIGS. 1(a), 1(b), 1(c) and 1(d) can be obtained.

At this time, the end face of the obtained ribboned polarization-maintaining fiber 1 is checked again, and a ribboned polarization-maintaining fiber that has not been rotationally adjusted with high accuracy is judged to be defective.

Although depending on the specification of product, basically, the accuracy of an angle with respect to the parallel lines of lower surface on which the ribboned polarization-maintaining fiber is mounted on the fiber array should preferably be ±3° of the desired angle.

For the ribboned polarization-maintaining fiber 1 manufactured as described above, only a portion corresponding to the mold 25 should preferably be made the ribbon portion 2. However, the shape of the ribbon portion 2 is sometimes nonuniform due to the in-flow of the adhesive 36 in the V-groove portions 23 of the ribbon-making jig 20 or other causes.

In this case, a part of the ribbon portion 2 is cut when the polarization-maintaining optical fiber array is manufactured, the coating in the end portion is removed with a hot stripper as in the case of the ordinary optical fiber ribbon, and the end face of the polarization-maintaining fiber is cut with a fiber cutter, by which the ribboned polarization-maintaining fiber with a ribbon portion having had a nonuniform shape can be used without problem.

At this time, the ribbon-making jig used in the present invention consists of, as shown in FIGS. 3(a), 3(b) and 3(c), and FIGS. 4(a) and 4(b), the ribbon-making groove 24a for fixing and coating the aligned polarization-maintaining fibers 12 by and with the adhesive 36, the lower mold 22 in which the V-groove portions 23 for arranging the polarization-maintaining fibers 12 are provided at both ends of the ribbon-making groove 24a, a ribbon-making groove 24b disposed symmetrically with the ribbon-making groove 24a in the lower mold 22, and the upper mold 26 in which an adhesive in-flow port 28 for supplying the adhesive 36 into the ribbon-making groove 24 (mold 25) is formed in a central portion of the ribbon-making groove 24b.

FIG. 5 shows another example of the ribboned polarization-maintaining fiber in accordance with the present invention. FIG. 5(a) is a left-hand side view, FIG. 5(b) is a front view, FIG. 5(c) is detailed view 1 of FIG. 5(a), and FIG. 5(d) is detailed view 2 of FIG. 5(a).

As shown in FIGS. 5(a) and 5(b), the ribboned polarization-maintaining fiber 1 in accordance with the present invention is disposed in almost the same plane, consists of the polarization-maintaining fibers 12 (UV coated polarization-maintaining fibers) in the plural number (eight in FIGS. 5(a) and 5(b)) extending longitudinally so as to be adjacent to each other substantially in parallel, and partially has the ribbon portion 2 of 2 to 300 mm in length (T).

In the present invention, as shown in FIGS. 5(a) and 5(b), the ribbon portion 2 preferably has positioning means, and the positioning means is preferably formed by a series of convex and concave shapes 5.

The series of convex and concave shapes 5 have a regular pitch and are of a saw shape in this example, but they are not subject to any special restriction. For example, the series of convex and concave shapes 5 may be disposed discontinuously, or may be a curved wavy shape or the like.

The reason for this is that in the case where a fiber array having a function as shown in FIG. 3 of JP-A-5-333225 is used, the relative position of the ribbon fiber and the V-groove of fiber array can be set with higher accuracy, and a high-quality fiber array without bent fibers etc. can be obtained.

Figure 6A:
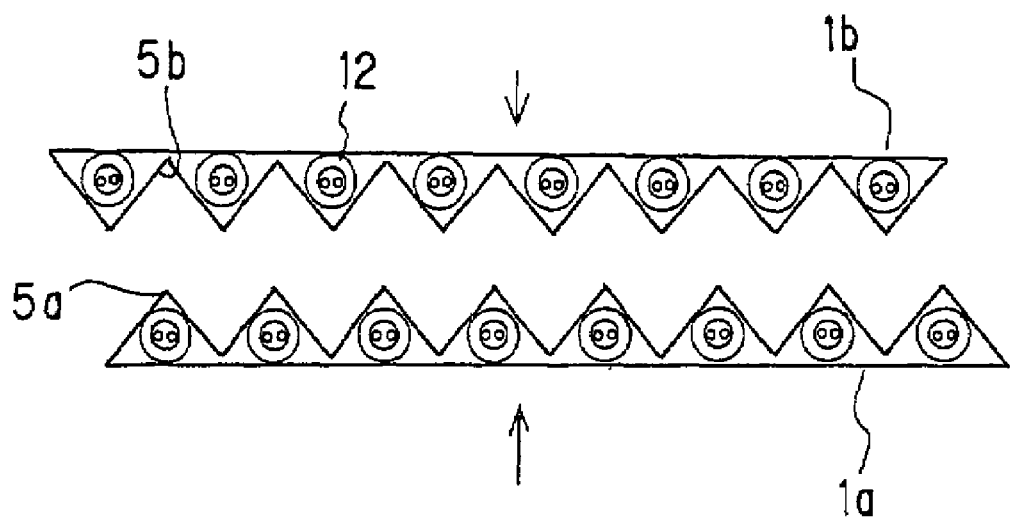
FIG. 6(a) is an explanatory view showing a positional relationship for engaging a series of convex and concave shapes of ribbon fibers when the ribboned polarization-maintaining fibers are lapped on each other.
Figure 6B:
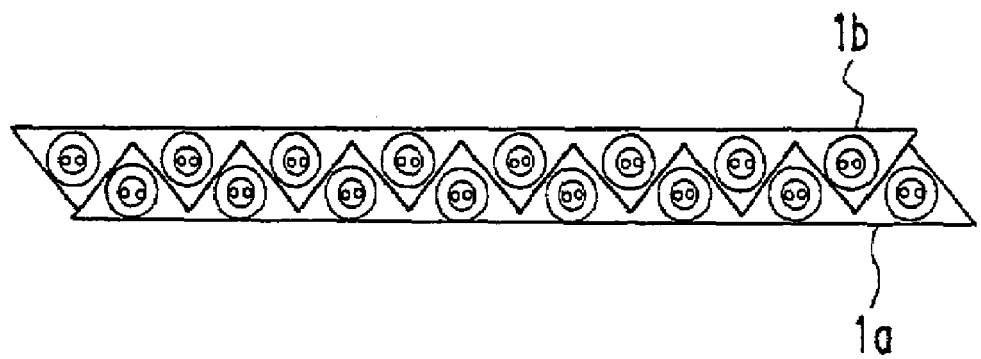
FIG. 6(b) is an explanatory view showing a state in which the ribboned polarization-maintaining fibers are lapped on each other, both figures showing an example of application of the ribboned polarization-maintaining fiber shown in FIGS. 5(a) to (c).
Figure 8:
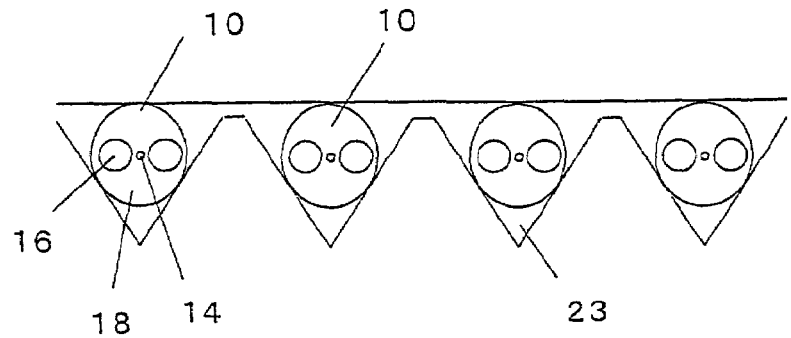
FIG. 8 is an explanatory view showing a state in which polarization-maintaining fibers are aligned in a V-groove portion.

Further, for example, as shown in FIGS. 6(a) and 6(b), when a ribboned polarization-maintaining fiber 1b is lapped on a ribboned polarization-maintaining fiber 1a, they are lapped on each other so that the positional relationship such that a series of convex and concave shapes 5b of the ribboned fiber 1b engages with a series of convex and concave shapes 5a of the ribboned fiber 1a is established, and a predetermined interval is provided by shifting the a series of convex and concave shapes 5b by one or several pitches, depending upon the necessity. Thereby, the right and left positioning of the upper and lower ribboned polarization-maintaining fibers 1b and 1a can be performed easily.

For example, when a half-pitch fiber array shown in FIGS. 9(a), 9(b) and 9(c) is manufactured, it is necessary to house the polarization-maintaining fibers 12 of upper and lower ribbon fibers 33a and 33b in a V-groove portion 34 of a lower substrate 31 in a state in which the two flat ribbon fibers 33a and 33b are lapped on each other (see FIG. 9(c)). In order to realize this configuration by using ribbon fibers in which polarization-maintaining fibers 12 with a diameter of 125 μm are aligned with a 250 μm pitch, the positioning in the right-and-left direction of the two ribbon fibers 33a and 33b is very important and troublesome work.

However, by using the ribboned polarization-maintaining fibers shown in FIGS. 5(a) and 5(b), the positioning in the right-and-left direction of the lapped ribbon fibers can be performed very easily and accurately, so that the merit is very great.

For the ribboned polarization-maintaining fiber in accordance with the present invention, it is important that in the ribbon portion 2, as shown in FIG. 5(c), a plurality of the polarization-maintaining fibers 12 be fixed by and coated with the adhesive 36, and the end face of the polarization-maintaining fiber 12 which is used at least as a signal be aligned so as to have the predetermined plane of polarization.

For the ribboned polarization-maintaining fiber in accordance with the present invention, the polarization-maintaining fibers 12 may be aligned so that the direction of the plane of polarization is "vertical, horizontal, vertical, horizontal, or the like" according to the application, for example, as shown in FIG. 5(d).

Furthermore, a half-pitch array whose each of the planes of polarization are repeatedly aligned in the vertical direction, and horizontal direction, alternately may be produced easily, like as the ordinary half-pitch array, by forming a half-pitch array in which either one of planes of polarization of the upper and lower ribbons is aligned horizontally, and the other is aligned vertically so as to align alternately the respective planes of the polarization of the upper and lower ribbons vertically and horizontally, as shown in FIGS. 5(c) and (d) instead of making the directions of the planes of polarization of the ribbon itself "vertically and horizontally, as shown in FIG. 1(d). That is, one may eliminate the miss arrangement of the direction of the plane of the polarization when one produces ribbons having the planes of polarization polarized in the vertical direction and the horizontal direction alternately. This is because one may only produce ribbons whose plane of the polarization is either vertical, or horizontal in the above-mentioned case at the time of adjusting the plane direction of polarization (making ribbons according to the present invention).

Moreover, one may apply the principle of the above-mentioned method to produce a fiber array having a pitch of 250 μm in addition to the case wherein a half-pitch array having a pitch of 127 μm. That is, one may firstly produce ribbons having a pitch of 500 μm, and lay ribbons up and down so as to make the upper and lower ribbons aligned alternately. Thereby, one may produce a fiber array having a pitch of 250 μm in which the planes of the polarization are aligned vertically and horizontally, alternately.

Also, as shown in FIG. 5(b), the length (T) of the ribbon portion 2 need not be longer than is necessary, and it is necessary only that a length contained in the fiber array be made into a ribbon form at the minimum.

However, after the ribboned polarization-maintained fiber has been manufactured, if the fibers are not fixed sufficiently before the fiber array is manufactured, the adjusted angle of rotation is in danger of being shifted. Also, when the fixing of this portion is deteriorated after the fiber array has been manufactured, there is a danger that a torsional stress etc. caused when the ribboned polarization-maintaining fiber is manufactured is applied to the fiber array, thereby decreasing the reliability of the fiber array itself. Therefore, the length (T) of the ribbon portion 2 should preferably be at least 2 mm.

Also, considering an excess length for fiber treatment such as removal and cutting of fiber coating at the time of manufacture of fiber array and rework in the assembly work, the length (T) should more preferably be 20 mm or longer.

When the ribboned polarization-maintaining fiber 1 in accordance with the present invention is manufactured, the end faces of the polarization-maintaining fibers are observed to make rotational adjustment such that the end face of the polarization-maintaining fiber has the predetermined plane of polarization. In this case, the length in which the direction of rotation can be adjusted exactly over the total length of the ribbon portion 2 is about 300 mm due to torsion of the polarization-maintaining fiber 10 caused by the contact of coatings 19 of the polarization-maintaining fibers 12 with each other. For this reason, the length (T) of the ribbon portion 2 should preferably be 300 mm or shorter.

The number of fibers in the ribboned polarization-maintaining fiber in accordance with the present invention is not subject to any special restriction. However, the ribboned polarization-maintaining fiber with five to sixteen fibers is easy to manufacture, and can be used suitably when the polarization-maintaining optical fiber array with multiple fibers is manufactured.

Next, another example of the manufacturing method for a ribboned polarization-maintaining fiber in accordance with the present invention will be described with reference to FIG. 7(a) to FIG. 7(i).

First, coatings at the tip ends of the polarization-maintaining fibers 12 are removed, and the end faces of the polarization-maintaining fibers (bare fibers) 10 are cut with a fiber cutter so as to be observed with a CCD camera (not depicted).

After eight polarization-maintaining fibers 12 are aligned in a V-groove portion provided on a lower mold (V-grooved substrate) 70 of a ribbon-making jig, upper molds (pressing substrates) 72 of the ribbon-making jig are placed at both ends of the V-grooved substrate 70 so that the polarization-maintaining fiber 12 can be rotated almost coaxially in a V-groove 71.

In this case, an inscribed circle of a triangle formed by the V-groove 71 and the pressing substrate 72 should preferably have a diameter slightly larger than that of the polarization-maintaining fiber 12.

Next, the polarization-maintaining fibers 12 are set in a rotating jig 80 (FIG. 7(a)), and the adhesive 36 is poured into the V-grooves from an adhesive supplier 83 in the V-grooved substrate 70 (FIG. 7(b)). After the adhesive 36 is made uniform with a spatula 74 (FIG. 7(c)), rotational adjustment is made so that a predetermined direction of polarization is provided while the end face of the polarization-maintaining fiber 12 is observed with a CCD camera (not depicted) (FIG. 7(e)).

As shown in FIG. 7(e), observation illumination 81, which is provided at a predetermined distance from the observation plane of the CCD camera, is applied slantwise in the direction of observation with the CCD camera from above the polarization-maintaining fiber 12, by which contrast between a stress-applied portion 16 of the polarization-maintaining fiber 12, in which light is scattered due to doped impurities, and a clad portion 18 can be made sharp. Therefore, the polarization-maintaining fiber can be rotationally adjusted more easily and accurately, as shown in FIG. 7(d) which shows a schematic view of demonstrating a way on how to adjust the position of polarization-maintaining fiber 10 during adjustment step of the direction of polarization plane.

After the above-described rotational adjustment has been made, the adhesive 36 is cured by UV irradiation using a UV lamp 82 to form the ribbon portion 2 (FIG. 7(f)), and then the pressing substrates 72, the rotating jig 80, and the V-grooved substrate 70 are removed, by which the ribboned polarization-maintaining fiber 1 shown in FIGS. 5(a), 5(b), 5(c) and 5(d) can be obtained.

Also, after the ribboned polarization-maintaining fiber with eight fibers is formed (FIG. 7(f)), eight polarization-maintaining fibers 12 are aligned in the adjacent V-groove portion of the V-grooved substrate 70, and the steps shown in FIG. 7(a) to FIG. 7(f) are carried out. Subsequently, the adhesive 36 is applied again to all of the sixteen fibers (FIG. 7(g)), and is cured (FIG. 7(h)), by which a ribboned polarization-maintaining fiber with sixteen fibers can be obtained (FIG. 7(i)).

Finally, the end face of the obtained ribboned polarization-maintaining fiber 1 is checked again, and a ribboned polarization-maintaining fiber that has not been rotationally adjusted with high accuracy is judged to be defective.

Although depending on the specification of product, basically, the accuracy of an angle with respect to the parallel lines of lower surface on which the ribboned polarization-maintaining fiber is mounted on the fiber array should preferably be ±3° of the desired angle.

The material for the ribbon-making jig 20, the lower mold (V-grooved substrate) 70, or the upper mold (pressing substrate) 72 used in the present invention is preferably a glass that transmits UV. However, since this material has difficulty in fabricating the ribbon-making grooves 24a and 24b, acrylic resin may be used.

In the case where acrylic resin is used, it is preferable that the thickness of the ribbon-making jig 20, the lower mold (V-grooved substrate) 70, or the upper mold (pressing substrate) 72 be made as small as possible not to hinder the UV transmission.

Also, it is preferable that the inside surface of the ribbon-making jig 20, the lower mold (V-grooved substrate) 70, or the upper mold (pressing substrate) 72 be formed of a material having a peeling effect, or the surface be coated with a peeling agent or subjected to coating to prevent the adhesion of adhesive.

It is preferable that the adhesive 36 used in the present invention be capable of being cured in a short period of time, and have a viscosity of 10000 cP or lower.

The reason for this is that if the curing of adhesive takes much time, fibers move from the state in which the rotational adjustment has been made, so that there is a danger that the adjusted fiber angle shifts.

Therefore, the adhesive should preferably be cured within 10 minutes. The use of a UV adhesive is preferable because this adhesive can be cured in a period of time as short as 5 minutes or shorter, and moreover there is no adverse influence on the adjusted fiber angle caused by a change in viscosity of adhesive during heating, which may be caused when a thermosetting adhesive is used.

Specifically, the adhesive used in the present invention should preferably be a UV adhesive, which is capable of being cured in a short period of time, because it is preferable that the polarization-maintaining fibers be fixed and coated rapidly after the polarization-maintaining fibers have been rotationally adjusted. In particular, the use of urethane acrylate resin, which is an ordinary coating, is more preferable.

The adhesive used in the present invention should preferably have a viscosity of 10000 cP or lower in order to prevent rotational interference of the polarization-maintaining fibers with each other by causing the adhesive to serve as a lubricant between the polarization-maintaining fibers when the polarization-maintaining fiber is rotationally adjusted.

As an adhesive that meets the above-described conditions, for example, urethane acrylate resin having a viscosity of 3000 cP can be cited.

The present invention will be described in more detail with reference to the following example. The present invention is not limited by the example.

EXAMPLE

Eight polarization-maintained fibers (PANDA fibers) with a fiber diameter of 125 μm and a coating diameter of 250 μm were prepared, and a coating at the tip end of each fiber was removed. Subsequently, the end face of polarization-maintained fiber was cut with a fiber cutter so as to be observed with a camera (not depicted), and then the polarization-maintained fibers 12 were aligned in the V-groove portions 23 with a 250 μm pitch of the lower mold 22 (ribbon-making jig 20) shown in FIG. 2(a).

At this time, urethane acrylate resin (adhesive 36) of 3000 cP was applied to portions in which the polarization-maintaining fibers 12 came into contact with each other (polarization-maintaining fibers 12 aligned in the ribbon-making groove 24a).

Thereafter, the polarization-maintaining fibers 12 were aligned one by one so that the end face thereof had the predetermined plane of polarization while the end face thereof was observed with a camera (not depicted).

Further, as shown in FIG. 2(b), the upper mold 26 was combined with the lower mold 22, urethane acrylate resin (adhesive 36) of 3000 cP was poured into the obtained mold 25, and the curing thereof was performed on one side with UV (150 mW×1 min).

At this time, the adhesive 36 only on the UV irradiation side was cured. Therefore, after the adhesive 36 on one side had been cured, the ribbon-making jig 20 was turned over, and the adhesive 36 on the other side was cured with UV (150 mW×1 min).

Subsequently, as shown in FIG. 2(c), the lower mold 22 and the upper mold 26 were removed, by which the ribboned polarization-maintaining fiber 1 was obtained. The length of the ribbon portion was 100 mm.

Next, two ribboned polarization-maintaining fibers manufactured by the above-described method were used to manufacture a sixteen-fiber polarization-maintained optical fiber array with a 250 μm pitch by the same method as that for a fiber array using the ordinary optical fiber ribbon (see FIGS. 9(a), 9(b) and 9(c)).

After the end face of the polarization-maintaining optical fiber array was polished, the polarization crosstalk characteristics were evaluated. As the result, it was found that all of the sixteen fibers had good characteristics of −20 dB or lower on all channels.

As described above, according to the present invention, when a polarization-maintaining optical fiber array is manufactured, the polarization-maintaining fibers need not be rotationally adjusted so as to have a predetermined plane of polarization, so that not only a polarization-maintained optical fiber array with multiple fibers can be manufactured easily but also the work efficiency and yield can be improved.

What is claimed is:

1. A ribboned array of polarization-maintaining fibers, comprising:
    a plurality of polarization-maintaining optical fibers, wherein a direction of the polarized wave of each of the plurality of polarization-maintaining optical fibers is rotated so as to be parallel to a predetermined plane of polarization; and
    a cured ribbon portion having first and second lateral ends, having a length of 2 to 300 mm and surrounding at least some of the polarization-maintaining optical fibers, the polarization-maintaining optical fibers extending individually from the second lateral end of the ribbon portion,
    wherein each of the polarization-maintaining optical fibers is rotated such that the polarized wave is parallel to the predetermined plane of polarization before the ribbon portion is cured, and
    at least an external exposed surface of said ribbon portion comprises a material that is capable of being stripped to expose the polarization-maintaining optical fibers without damaging the polarization-maintaining optical fibers.

2. A ribboned array of polarization-maintaining fibers according to claim 1, wherein at least some of the polarization-maintaining optical fibers also extend from the first lateral end of the ribbon portion.

3. A ribboned array of polarization-maintaining fibers according to claim 1, wherein said cured ribbon portion is a cured adhesive.

4. The ribboned array of polarization-maintaining fibers according to claim 1, wherein said ribbon portion is formed by fixing and coating said polarization-maintaining optical fibers with an adhesive, and aligning end faces of said polarization-maintaining optical fibers so as to have said predetermined plane of polarization.

5. The ribboned array of polarization-maintaining fibers according to claim 1, said ribbon portion further comprising positioning means for maintaining alignment of said polarization-maintaining optical fibers at said predetermined plane of polarization.

6. The ribboned array of polarization-maintaining fibers according to claim 5, wherein said positioning means is formed as a series of convex and concave shapes.

7. The ribboned array of polarization-maintaining fibers according to claim 6, wherein said convex and concave shapes are disposed at a regular pitch or discontinuously.

8. The ribboned array of polarization-maintaining fibers according to claim 7, wherein said convex and concave shapes are formed as a saw tooth shape or a curved wavy shape.

* * * * *